United States Patent Office 3,725,205
Patented Apr. 3, 1973

3,725,205
APPARATUS FOR CLEANING SEWAGE WATER
Helge K. Heen, Avon, N.Y., assignor to Adaks
Products Incorporated
Filed May 12, 1970, Ser. No. 36,637
Int. Cl. B01d 1/00, 3/00, 3/42
U.S. Cl. 202—181                              12 Claims

ABSTRACT OF THE DISCLOSURE

Sewage water is fed to a surge tank, and from there, periodically and in predetermined quantities, through a batching valve to a sealed evaporator tank, which is surrounded adjacent its lower end by a condensing chamber. When the level of the liquid in the evaporator drops to a predetermined low limit, sensing means opens the batching valve momentarily to fill the tank, thereby starting a vacuum pump which reduces the pressure in the tank and chamber approximately to the saturated vapor pressure in the tank. A vapor fan then pumps vapor from the tank to the chamber, where the vapor condenses and transfers heat to the remaining sewage water in the tank. Periodically the slurry in the tank is automatically discharged and incinerated.

---

Figure 1:
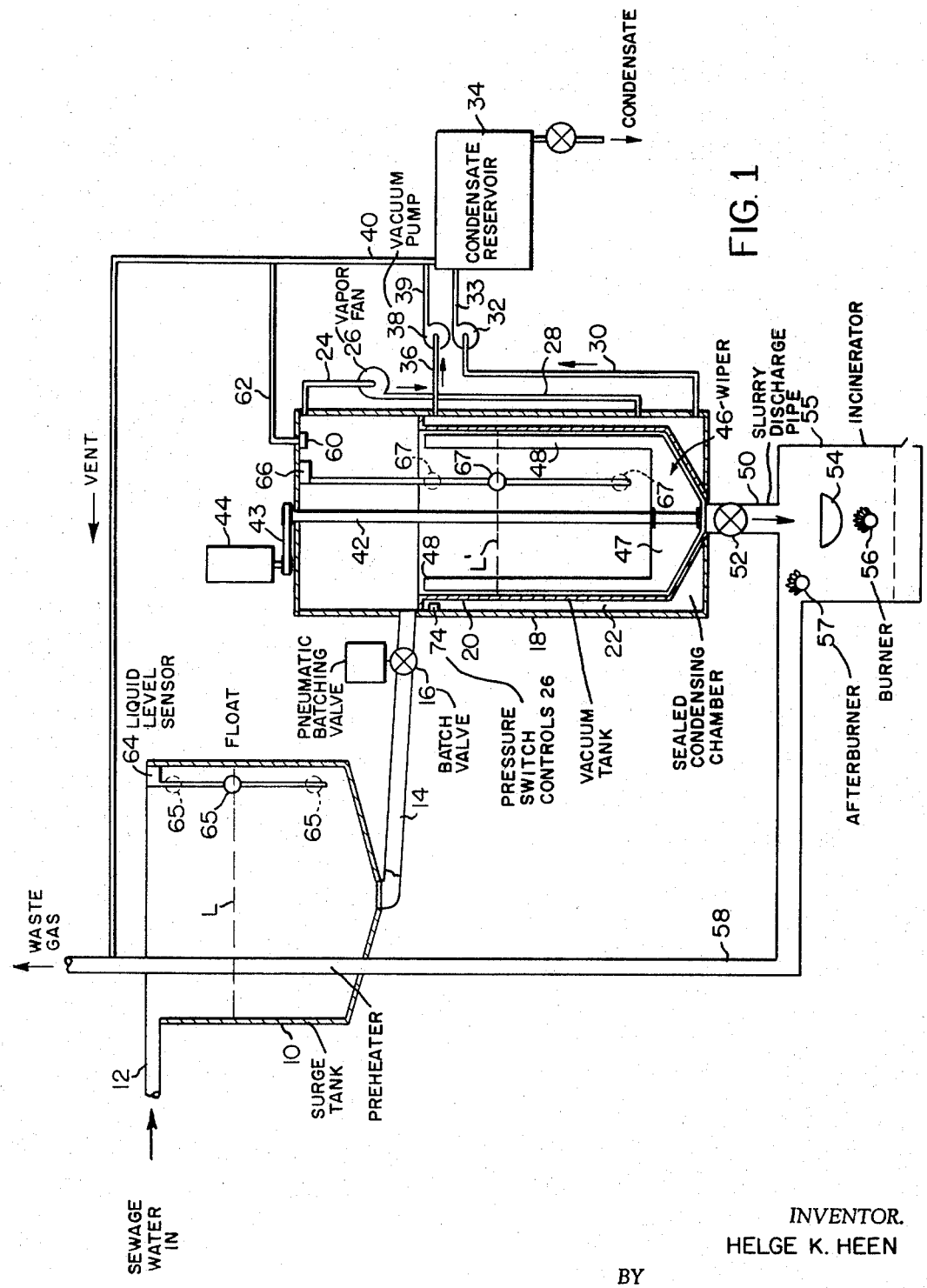

This invention relates to the purification of water, and more particularly to a method and apparatus for producing clean water from sewage water, and the like.

Each year the demand for clean, potable water increases. An equally pressing problem is the ever increasing pollution of many of the rivers, streams and lakes, which formerly met many of these demands for clean water. The apparatus of this invention serves the dual purpose of cleaning sewage or waste water, and in turn helps to reduce pollution of our rivers, streams and lakes.

Heretofore efforts to develop practical apparatus for cleaning sewage water have not been entirely satisfactory. Most such prior apparatus has been designed primarily for handling extremely large quantities of sewage, and consequently has found little use except in municipal plants and the like. Moreover, such apparatus is usually designed to reduce the sewage content merely to a pollution-free level, and is not designed to remove all solid and chemical impurities from the water.

An object of this invention is to provide an improved method and apparatus for cleaning sewage water, and for disposing of the solid by-products of the cleaning operation.

Another object of this invention is to provide apparatus of the type described, which is designed to handle smaller quantities of sewage water than prior such apparatus, and consequently is substantially more compact and versatile.

A more specific object of this invention is to provide novel sewage water cleaning apparatus in which an evaporator is operated nearly at room temperature to distill clean water from sewage waste.

A still further object of this invention is to provide means for automatically and periodically removing and incinerating the solid by-products resulting from the distillation of sewage water in apparatus of the type described.

Other objects of the invention will be apparent hereinafter from the specification and from the recital of the appended claims, partciularly when read in conjunction with the accompanying drawings.

Figure 2:
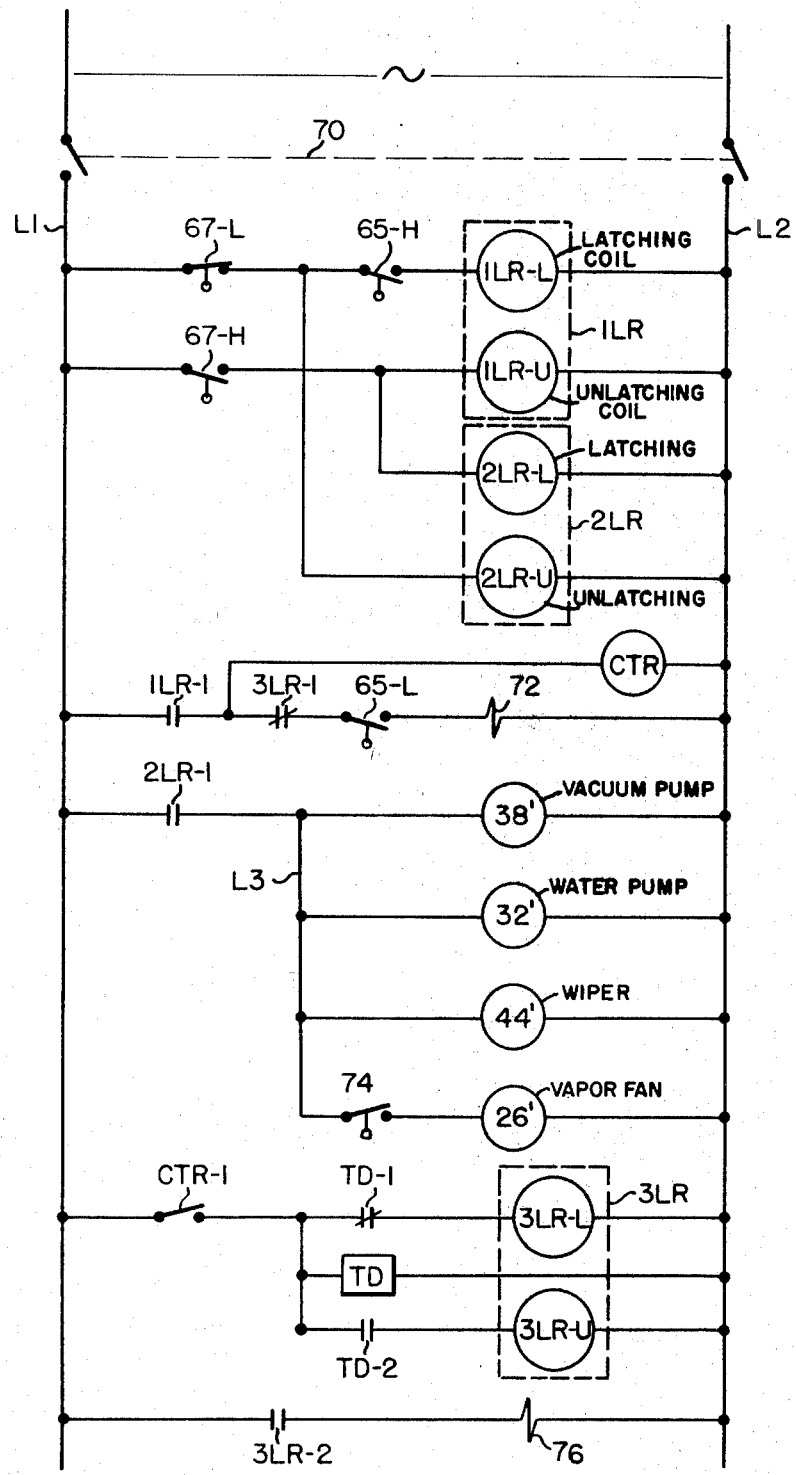

In the drawings:

FIG. 1 is a fragmentary elevational view of sewage water cleaning apparatus made in accordance with one embodiment of this invention; and FIG. 2 is a wiring diagram illustrating one manner in which the apparatus may be wired for operation.

Referring now to the drawings by numerals of reference, and first to FIG. 1, 10 denotes an insulated surge tank, which receives sewage water from an inlet pipe 12, which feeds into the upper end of the tank. The lower end of the tank is connected by a pipe 14, and through a conventional, pneumatically-operated batching valve 16 in this pipe, with the interior of a sealed, insulated, cylindrical vacuum tank or evaporator 18 adjacent the upper end thereof. Secured in the lower end of tank 18 in spaced coaxial relation thereto is a heat transfer jacket or wall 20, opposite ends of which are secured to the inside of tank 18 to form a sealed condensing chamber 22 between the tank 18 and jacket 20.

Adjacent its upper end tank 18 is connected by a pipe 24 to the inlet of a vapor compression fan 26, the output of which is connected by a pipe 28 to the condensing chamber 22 adjacent the lower end thereof. Beneath pipe 28 chamber 22 is connected by a pipe 30 to the inlet of a water pump 32, the output of which is connected by a pipe 33 to a clean water tank or reservoir 34. Adjacent its upper end chamber 22 is connected by a pipe 36 to the inlet of an evacuation pump 38, the output of which is connected to a vent pipe 40, which rises vertically from the water tank 34.

Mounted to rotate in the tank 18 coaxially thereof, and projecting at its upper end through the sealed upper end of tank 18, is an elongate drive shaft 42. Exteriorly of the tank 18 the upper end of shaft 42 is connetced, for example, by a belt 43 to the drive shaft of a motor 44, which is adapted periodically to be energized to rotate the shaft 42 as described hereinafter. Fastened to the lower end of shaft 42 for rotation thereby in jacket 20 coaxially of tank 18 is a flat, bifurcated wiper member 46. Member 46 has a transverse web or hub portion 47, which is fastened to the shaft 42, and a pair of spaced, parallel uprights or furcations 48, which project upwardly from opposite ends of the web portion adjacent diametrally opposite sides of jacket 20. Along its outer surface the wiper 46 conforms to the configuration of jacket 20, and is disposed in closely spaced relation thereto, so that upon being rotated the wiper 46 tends to sweep or clean deposits from the confronting, inner surafce of jacket 20.

The lower ends of the jacket 20 and the tank 18 have registering openings that are connected to the upper end of a slurry discharge pipe 50. Mounted in pipe 50 intermediate its ends is a conventional, pneumatically-operated slurry valve 52, which is operable selectively to drain the contents of tank 18, or jacket 20, into a slurry cup or receptacle 54, which registers with the lower end of pipe 50. Slurry cup 54 is housed in a furnace jacket 55, which contains a pair of conventional burners 56 and 57, and which is connected adjacent its upper end with a flue pipe or chimney 58, which projects upwardly through the surge tank 10 to the exterior of the building in which the system is housed. Burner 56 is positioned beneath the cup 54 for incinerating the contents of the cup; and the burner 57 is placed adjacent the inlet to flue 58 to function as an after-burner for removing fumes, odors and combustible gases resulting from the incineration of the material in the slurry cup.

A conventional relief valve 60 is mounted in the upper end of tank 18, and is connected by a pipe 62 to the vent pipe 40, which in turn is connected at its upper end to the flue 58. Valve 60 is set to vent tank 18 in the event that excessive pressure builds up in the tank as the result of having permitted sewage residue to remain undisturbed in tank 18 for extended periods of time.

Mounted in the surge tank 10 adjacent its upper end, and projecting downwardly into this tank, is a conventional liquid level sensor 64, which is operative to determine the level L of the liquid in tank 10. For this purpose the sensor 64 may comprise, for example, a float 65, which is guided on sensor 64 to float between upper and lower limit positions, which are denoted in FIG. 1 by the broken line representations of the float 65. When float 65 is moved by liquid in tank 10 to its uppermost or high position, it closes a normally-open switch 65—H (FIG. 2); and when it drops with the level of the liquid in tank 10 to or beneath its lower limit position, it permits a switch 65—L (FIG. 2) to open. Switch 65—L normally is held closed when the level L of the liquid in the tank 10 is high enough to cause the float 65 to be held above its lower limit position.

Mounted in tank 18 adjacent the upper end thereof, and extending downwardly into this tank is another liquid level sensor 66, which is used to detect the level L' of the liquid in tank 18. For this purpose the sensor 66 may be provided with, for example, a float 67, which is guided on the sensor to float between upper and lower limits, which are represented in FIG. 1 by the broken line representations of float 67. When float 67 is in its upper or high position it closes a normally-open switch 67—H (FIG. 2), and when it is in or beneath its low position, it permits switch 67—L (FIG. 2) to close. When the float 67 is above its low limit position, switch 67—L will be held open.

Referring now to FIG. 2, lines L1 and L2 represent the system power lines, which are adapted to be connected through a conventional ON-OFF switch 70 to an AC power supply of, for example, 110 volts. The switches 67—L and 65—H are connected in series with one another and with the latching coil 1LR—L of a latching relay 1LR between the lines L1 and L2. The unlatching coil 1LR—U of this relay is connected in series with the switch 67—H between the lines L1 and L2. A further latching relay 2LR has its latching coil 2LR—L connected in parallel with the unlatching coil 1LR—U, and its unlatching coil 2LR—U connected in parallel with the switch 65—H and the latching coil 1LR—L. Relays 1LR and 2LR control the switches 1LR—1 and 2LR—1, respectively.

Also connected in series between the lines L1 and L2 are the switches 1LR—1, a further relay switch 3LR—1, the switch 65—L and a solenoid 72, which controls the input or pneumatically-operated batching valve 16. When the solenoid 72 is energized, the valve 16 is opened; and conversely, when solenoid 72 is deenergized, the valve 16 is closed. Also connected in series with switch 1LR—1, and in parallel with the switches 3LR—1 and 65—L, and the solenoid 72, is the energizing coil CTR for a conventional counter (not illustrated) of the type which closes a normally-open switch CTR—1 once every tenth time that the coil CTR is energized.

Switch 2LR—1 is connected at one side to line L1, and at its opposite side to a line L3 (FIG. 2). Connected in series with the switch 2LR—1, and in parallel with one another between the lines L3 and L2, are the motors 38', 32', 44' and 26' for the vacuum pump 38, the water pump 32, the wiper motor 44 and the vapor fan 26, respectively. A pressure-responsive switch 74, which is mounted in chamber 22 adjacent the upper end thereof (FIG. 1), has its contacts connected in series with the vapor fan motor 26' between lines L3 and L2. Switch 74 is a vacuum switch, which is set to remain open until the pressure in chamber 22 falls to, for example, approximately 1.5 pounds per square inch.

Connected in series with the switch CTR—1 (FIG. 2), and in parallel with one another between the lines L1 and L2, are the latching and unlatching coils 3LR—L and 3LR—U of a further latching relay 3LR, and a time delay device TD. The time delay TD operates a normally-closed, time-delay-opening switch TD—1, which is connected in series with the switch CTR—1 and coil 3LR—L, and a normally-open, time-delayed-closing switch TD—2, which is connected in series with switch CTR—1 and the coil 3LR—U. The latching relay 3LR controls switches 3LR—1 and 3LR—2. The relay switch 3LR—2 is connected in series with a solenoid 76, which controls the slurry discharge valve 52. When the solenoid 76 is energized the valve 52 is opened; and when the solenoid 76 is deenergized, the valve 52 is closed.

In use, when sewage water is flowing from pipe 12 to the surge tank 10, the master switch 70 is closed to supply power to the lines L1 and L2. Assuming that the switches 1LR—1, CTR—1 and 3LR—2 are in their open positions, and that the tank 18 is empty, the switch 67—L will be closed, whereby the unlatching coil 2LR—U will be energized so that switch 2LR—1 will be open to prevent energization of the motors 38', 32', 44' and 26'. The now-closed switch 67—L also enables the relay latching coil 1LR—L to become energized as soon as the level L of the liquid in the surge tank 10 has risen high enough to effect the closure of switch 65—H. As soon as switch 65—H does close, it energizes coil 1LR—1, whereby the switch 1LR—1 is latched closed to energize the solenoid 72 through the now-closed switch 1LR—1, the normally-closed switch 3LR—1 and the switch 65—L, which at this time will be held closed because the level of the liquid in tank 10 is well above the lower limit position of float 65. The closing of switch 1LR—1 also energizes the counter coil CTR so that the counter is advanced or indexed one count closer to the tenth count, at which time it will close switch CTR—1.

With the solenoid 72 energized the valve 16 is opened to admit sewage water from the tank 10 to the interior of the tank 18 and jacket 20. This causes the float 67 to rise until it reaches its upper limit position, at which time it will close switch 67—H, thereby energizing the unlatching coil 1LR—U, so that switch 1LR—1 is returned to its open position, thereby deenergizing the solenoid 72 and closing valve 16 to stop the flow of sewage water into tank 18. Concurrently with the energization of the coil 1LR—U, the latching coil 2LR—L is energized, thereby closing switch 2LR—1 simultaneously to energize the motors 38', 32' and 44'. The pressure-responsive switch 74 is open at this point, so that the vapor fan motor 26' is not yet energized. It is not until the vacuum pump 38 has reduced the pressure in the chamber 22 to approximately 1.5 pounds per square inch, or less, that the switch 74 is moved to its closed position to energize the vapor fan motor 26'. This is a precautionary measure taken to prevent the fan 26 from running in dense gases, which might overload and thus tend to burn up its motor 26'.

At this time the wiper 46 is being rotated by the motor 44', the motor 32' is operating the pump 32 to withdraw any condensate which forms in the chamber 22, and the motor 38' is operating the vacuum pump 38 to lower the pressure in the chamber 22. Due to inherent leakage through the now non-operating fan 26, the pump 38 serves also to lower the pressure above the batch of sewage water in tank 18, so that the liquid therein begins to vaporize rapidly. By the time the pressure in the chamber 22 has fallen low enough to close switch 74, there will be only a slight, if any, pressure differential between chamber 22 and the space in tank 18 above the sewage water therein. When the switch 74 finally closes, the now-energized fan 26 begins to withdraw vapor from the top of tank 18 through the pipe 24, and to pump this vapor through the pipe 28 into the condensing chamber 22.

The fan 26 is selected so that it can just overcome the static pressure in the condensing chamber 22 to provide a slight head or pressure increase in the pumped vapor, so that the vapor entering the condensing chamber 22 is at a slightly higher pressure, and consequently a slightly higher temperature, than the vapor in the top of tank 18. Because of this slight increase in its pressure, the vapor entering the condensate chamber 22 condenses on the walls of the chamber, and particularly on the outer surface of the jacket 20, since the inner surface of the jacket, or the surface engaged with the liquid batch of sewer water, is at a temperature less than that of the vapor entering chamber 22. Consequently, the heat which is given up by the vapor that condenses in chamber 22 is transmitted through the jacket 20 to the sewage water on the opposite side of the jacket, thereby to help maintain the temperature of the sewage water that is being evaporated. This heat transfer is enhanced by the rotating wiper 46, which serves to mix the sewage water in the tank 18, and to remove any sediment or deposits, which otherwise might tend to build up on the surface of the jacket 20 and therefore interfere with proper heat transfer through the jacket. The vapor that condenses in chamber 22 is constantly pumped through the pipe 30, pump 32 and pipe 33 to the water tank or reservoir 34.

The rate of evaporation in tank 18, and hence the rate at which clean water is produced, is controlled by three principal factors; (1) the ease of heat transfer through the jacket 20 from the condensing vapor in chamber 22 to the liquid sewage water in tank 18; (2) the temperature of the sewage water in tank 18; and (3) the capacity of the vapor fan. It is important that the pump 38 cause the pressure in the tank 18 above the batch of liquid sewage to be lowered to a value at least equal to the saturated vapor pressure of the liquid batch, so that the liquid will boil. While the liquid will evaporate even though the pressure in the top of tank 18 is slightly above the saturated vapor pressure of the liquid, the rate of evaporation will be much slower; and consequently, to make the apparatus effective, much larger equipment would have to be employed. Therefore, in order to keep the equipment small enough to make it practical for use by the individual home-owner, it is most desirable that the pressure in chamber 18 above the liquid sewage be maintained approximately equal to the saturated vapor pressure of the sewage water, so that the later will boil.

If the pump 38 should operate to reduce the pressure in tank 18 to a value below the saturated vapor pressure of the liquid in the tank, the rate of evaporation or cleaning of the sewage water would be somewhat increased, but this would produce a corresponding loss of heat from the water in the tank, so that the heat of condensation in the tank 22 would not be sufficient to keep the sewage water boiling upon being transferred through the jacket 20 to the water. This condition, however, would be self correcting, since the drop in temperature of the water in the tank 18 would cause a corresponding lowering of the saturated vapor pressure above the water, until, except for the slight head developed by the fan 26, the saturated vapor pressure would be approximately equal to the pressure developed by the vacuum pump 38.

When the evaporation process has lowered the liquid in the tank 18 to the point where the float 67 permits the switch 67—L again to close, the unlatching coil 2LR—U will be energized to open the switch to 2LR—1, thereby deenergizing motors 38', 32', 44', and 26'. At the same time, or as soon thereafter as the switch 65—H is closed as the result of the surge tank 10 being filled, the latching coil 1LR—L is once again energized to open the valve 16 long enough to admit another batch of sewage water to the tank 18, and also once again to index or step the counter through its coil CTR.

This automatic cycle of evaporating and condensing one batch of sewage water after another continues until the counter coil CTR has been energized for the tenth time. Then the switch CTR—1 is closed to energize the latching coil 3LR—L through the normally-closed switch TD—1, and to energize also the time delay unit TD. This causes the normally-closed switch 3LR—1 to be opened to prevent the energization of solenoid 72 and consequent opening of the batching valve 16, and also causes switch 3LR—2 to close and energize solenoid 76, thereby opening valve 52 to permit any sludge or slurry, which has collected in the tank 18, to drop downwardly through pipe 50 to the slurry cup 54 for incineration by the burners 56 and 57. Shortly after the valve 52 is opened, the time delay unit TD expires, or otherwise causes switch TD—1 to open to deenergize coil 3LR—L, and also causes the time-delayed closing switch TD—2 to close and energize the unlatching coils 3LR—U. This opens switch 3LR—2 to deenergize solenoid 76 and close valve 52, and simultaneously recloses switch 3LR—1, so that the solenoid 72 now becomes energized to open the batching valve 16. Another batch of sewage water is then admitted to tank 18 and evaporated. The next time that switch 1LR—1 closes, the counter coil CTR advances the associated counter and opens the switch CTR—1 to prevent the valve 52 from being reopened until nine more batches of sewer water have been evaporated by the apparatus.

From the foregoing it will be apparent that the instant invention provides relatively simple and inexpensive apparatus for distilling or otherwise cleaning sewage and other such waste water. The normal household output of sewage water is approximately 375 gallons per day; and depending upon various factors, the temperature of this sewage water may vary, for example, anywhere from 65° F. to 95° F. Assuming that the inlet temperature of the water in the evaporator tank 18 is at 95° F., the vacuum pump 38 is selected to reduce the pressure in tank 18 above the sewage water to approximately 0.815 pound per square inch. This is the approximate saturated vapor pressure at which the 95° F. sewage water will boil. The vapor fan is selected to produce a pressure increase of approximately 0.286 pound per square inch in the vapor that it delivers from tank 18 to the condensing chamber 22. This will place the temperature of the condensate in the chamber 22 at approximately 105° F. so that there would be a 10° F. temperature differential between chamber 22 and the sewage water contained in tank 18. With these parameters the illustrated apparatus would be capable of cleaning or evaporating approximately 500 gallons of sewage water per day, which is more than adequate for the average household output of 375 gallons per day. For the same apparatus this output would, of course, decrease with any decrease in the inlet temperature of the sewage water. Then, in order to maintain the 500 gallon per day output the size of the vapor fan 26 and pump 38 would have to be increased.

While in the embodiment illustrated the wiper drive motor 44 and the vapor fan motor 26 have been illustrated as being placed outside of the tank 18, they could be replaced by specially sealed motors and mounted within the tank 18 to eliminate the need for rotating vacuum seals for shaft 42. Moreover, it should be noted that the apparatus will operate properly if the evaporator tank 18 were to be inclined to the vertical, or were to have some shape other than cylindrical, as long as the suction end of the pipe 24 leading to the vapor fan is maintained above the level L' of the liquid in the evaporator. Although the incineration equipment housed in the furnace jacket 55 will contribute some heat to the sewage water, when used, the incinerator portion of the unit is not essential to the operation of the evaporator portion. For example, if the slurry from the tank 18 were to be collected in a tank and later hauled away by a pumper truck, or the like, the incineration equipment could be eliminated. Moreover, it will be apparent to one skilled in the art that the evaporating unit could also be used for a number of industrial processes, for example, drying or concentrating milk and like products. In such instance it might be desirable to modify the counter mechanism to cause the slurry discharge valve 52 to be opened at the end of the evaporation of each batch in the tank 18. When used in an industrial process for drying a product, the cycle would be modified to open valve 52 after each batch has been treated. For example, the evaporation step could be stopped by a record pressure gauge which would sense that the pressure in tank 18 had dropped to an unusually low level of 0.5 pound per square inch. This would indicate that substantially all water had been evaporated and that the product in tank 18 was dry.

Having thus described my invention, what I claim is:

1. Apparatus for cleaning sewage water, comprising a sealed evaporator tank having adjacent its lower end an outer wall, and an inner cylindrical wall, said walls defining therebetween a condensing chamber which surrounds a first portion of said tank adjacent said lower end thereof, means for connecting said tank to a supply of sewage water and operable to admit water from said supply to said tank at least partially to fill said first portion thereof, vacuum means connected to said chamber and operable to reduce the pressure in said chamber, and in the space in said tank above the level of the liquid therein by the evacuation of air therefrom, to a value approximately equal to the saturated vapor pressure of the liquid in said tank, means for pumping vapor from said space in said tank to said chamber and operative to cause the vapor in said chamber to condense on the side walls thereof at a pressure and temperature slightly above that of the pressure and temperature of the vapor in said tank, an agitator mounted to rotate in said tank in contact with the liquid therein, said inner wall being made of a heat conductive material operative to transfer heat, which is given up by said vapor upon condensing in said chamber, from said chamber to the remaining liquid in said tank, means for detecting the quantity of liquid in said tank, and control means connected to said detecting means and operative to prevent operation of said vacuum means and said vapor pumping means when the quantity of liquid in said tank falls below a predetermined value.

2. Apparatus for cleaning sewage water, comprising a sealed evaporator tank surrounded adjacent its lower end by a condensing chamber, means for connecting said tank to a supply of sewage water and operable to admit water from said supply to said tank partially to fill the latter, vacuum means connected to said chamber and operable to reduce the pressure in said chamber, and in the space in said tank above the level of the liquid therein, to a value approximately equal to the saturated vapor pressure of the liquid in said tank, means for pumping vapor from said space in said tank to said chamber and operative to cause the vapor in said chamber to condense on the side walls thereof at a pressure and temperature slightly above that of the pressure and temperature of the vapor in said tank, means for transferring heat, which is given up by said vapor upon condensing in said chamber, from said chamber to the remaining liquid in said tank, said connecting means comprising a normally-closed batching valve interposed between said tank and said supply, means in said tank for sensing the level of the liquid therein, control means responsive to said sensing means momentarily to open said batching valve to admit a predetermined quantity of sewage water from said supply to said tank, each time said level of said liquid falls to a predetermined low level in said tank, a second, normally-closed valve connected to the bottom of said tank and operative, when open, to discharge the contents of said tank, and means operative automatically to open said second valve momentarily after said batching valve has been opened a predetermined number of times.

3. Apparatus for cleaning sewage water, comprising a sealed evaporator tank surrounded adjacent its lower end by a condensing chamber, means for connecting said tank to a supply of sewage water operable to admit water from said supply to said tank partially to fill the latter, vacuum means connected to said chamber and operable to reduce the pressure in said chamber, and in the space in said tank above the level of the liquid therein, to a value approximately equal to the saturated vapor pressure of the liquid in said tank, means for pumping vapor from said space in said tank to said chamber and operative to cause the vapor in said chamber to condense on the side walls thereof at a pressure and temperature slightly above that of the pressure and temperature of the vapor in said tank, means for transferring heat, which is given up by said vapor upon condensing in said chamber, from said chamber to the remaining liquid in said tank, said connecting means comprising a normally-closed batching valve interposed between said tank and said supply, means in said tank for sensing the level of the liquid therein, control means responsive to said sensing means momentarily to open said batching valve to admit a predetermined quantity of sewage water from said supply to said tank, each time said level of said liquid falls to a predetermined low level in said tank, a movable wiper member mounted in said tank for movement in closely spaced confronting relation to the inner surface of said tank to prevent deposits from building up on said inner surface, and drive means operable to move said member, and means for operating said drive means whenever said vacuum means is operating.

4. Apparatus for cleaning sewage water, comprising a sealed evaporator tank surrounded adjacent its lower end by a condensing chamber, means for connecting said tank to a supply of sewage water and operable to admit water from said supply to said tank partially to fill the latter, vacuum means connected to said chamber and operable to reduce the pressure in said chamber, and in the space in said tank above the level of the liquid therein, to a value approximately equal to the saturated vapor pressure of the liquid in said tank, means for pumping vapor from said space in said tank to said chamber and operative to cause the vapor in said chamber to condense on the side walls thereof at a pressure and temperature slightly above that of the pressure and temperature of the vapor in said tank, means for transferring heat, which is given up by said vapor upon condensing in said chamber, from said chamber to the remaining liquid in said tank, said connecting means comprising a normally-closed batching valve interposed between said tank and said supply, means in said tank for sensing the level of the liquid therein, control means responsive to said sensing means momentarily to open said batching valve to admit a predetermined quantity of sewage water from said supply to said tank, each time said level of said liquid falls to a predetermined low level in said tank, a second, normally-closed valve connected to the bottom of said tank and operative, when open, to discharge the contents of said tank, means operative automatically to open said second valve momentarily after said batching valve has been opened a predetermined number of times, incinerator means mounted beneath said tank, and means connecting the output of said second valve to a receptacle in said incinerator means, whereby the slurry discharged from said tank may be incinerated in said receptacle.

5. Apparatus for cleaning sewage water, comprising a sealed evaporator tank surrounded adjacent its lower end by a condensing chamber, means for connecting said tank to a supply of sewage water and operable to admit water from said supply to said tank partially to fill the latter, vacuum means connected to said chamber and operable to reduce the pressure in said chamber, and in the space in said tank above the level of the liquid therein, to a value approximately equal to the saturated vapor pressure of the liquid in said tank, means for pumping vapor from said space in said tank to said chamber and operative to cause the vapor in said chamber to condense on the side walls thereof at a pressure and temperature slightly above that of the pressure and temperature of the vapor in said tank, means for transferring heat, which is given up by said vapor upon condensing in said chamber, from said chamber to the remaining liquid in said tank, and pressure responsive means in said chamber operative to prevent operation of said vapor pumping means until the pressure in said chamber has been reduced to a predetermined value by said vacuum means.

6. Apparatus for cleaning sewage water, comprising a sealed evaporator tank surrounded adjacent its lower end by a condensing chamber, means for connecting said tank to a supply of sewage water and operable to admit water from said supply to said tank partially to fill the latter, vacuum means connected to said chamber and operable to reduce the pressure in said chamber, and in the space in said tank above the level of the liquid therein, to a value approximately equal to the saturated vapor pressure of the liquid in said tank, means for pumping vapor from said space in said tank to said chamber and operative to cause the vapor in said chamber to condense on the side walls thereof at a pressure and temperature slightly above that of the pressure and temperature of the vapor in said tank, means for transferring heat, which is given up by said vapor upon condensing in said chamber, from said chamber to the remaining liquid in said tank, said connecting means comprising a normally-closed batching valve interposed between said tank and said supply, means in said tank for sensing the level of the liquid therein, control means responsive to said sensing means momentarily to open said batching valve to admit a predetermined quantity of sewage water from said supply to said tank, each time said level of said liquid falls to a predetermined low level in said tank, said sewage water supply comprising a second tank connected adjacent its upper end to a sewage water supply line, and having its lower end connected through said batching valve to said evaporator tank, said second tank having therein means for sensing the level of the liquid therein, and said control means including means responsive to the level sensing means in both said tanks to open said batching valve only when the liquid in said evaporator tank has fallen to said predetermined low level, and the liquid in said second tank has risen to a predetermined high level.

7. Apparatus as defined in claim 6, wherein said control means includes further means for preventing the opening of said batching valve, when the level of liquid in said second tank has fallen to a predetermined low level beneath said high level.

8. Apparatus for the batch-type cleaning of sewage water, comprising a sealed tank having therein a first chamber for holding a batch of liquid, and a second chamber surrounding said first chamber adjacent the lower end thereof, and sealed off from said first chamber by a wall having good heat transfer properties, means including a normally-closed valve for connecting said first chamber to a supply of sewage water, means in said first chamber for sensing the level of the liquid therein, means operable, when said level falls below a predetermined value, momentarily to open said valve partially to fill said first chamber with sewage water, a duct connected at one end to said first chamber adjacent the upper end thereof, and at its opposite end to said second chamber, thereby to connect said second chamber with the space in said first chamber above the level of the liquid therein, a vacuum pump connected to said second chamber and communicating through said duct with said first chamber to lower the pressure in both of said chambers to values approximately equal to the saturated vapor pressure in said space in said first chamber, a vapor fan interposed in said duct and operable to pump vapor from said space to said second chamber, the pressure and temperature of the vapor entering said second chamber being slightly greater than the pressure and temperature of the water and vapor in said first chamber, whereby upon contacting the surface of said wall in said second chamber, said vapor in said second chamber is condensed and transfers heat through said wall to the liquid in said first chamber, means for agitating the liquid in said first chamber, means for pumping the condensed liquid out of said second chamber, and means for preventing operation of said pump, said fan and said agitating means when the level of the liquid in said first chamber falls below said predetermined value.

9. Apparatus as defined in claim 8, wherein said means for periodically opening said valve comprises means in said first chamber for sensing the level of the sewage water therein, and control means connected to said sensing means and operable to open said valve, when the level of the liquid in said first chamber has fallen to a predetermined low level, and to close said valve, when the level of the liquid in said first chamber has risen to a predetermined high level, and said control means includes means for operating said vacuum pump and said vapor fan only when the level of the liquid in said first chamber is above said predetermined low level.

10. Apparatus as defined in claim 8 wherein said means for periodically opening said valve comprises means in said first chamber for sensing the level of the sewage water therein, and control means connected to said sensing means and operable to open said valve, when the level of the liquid in said first chamber has fallen to a predetermined low level, and to close said valve, when the level of the liquid in said first chamber has risen to a predetermined high level, and said means for connecting said first chamber to a supply of sewage water further includes a second tank connected adjacent its upper end to a sewage water supply line, and adjacent its lower end to said sealed tank through said valve, second liquid level sensing means in said second tank to sense the level of the liquid therein, and means connecting said second liquid level sensing means to said control means and operative to enable said valve to be opened by said control means only when the level of the liquid in said second tank has reached a predetermined high level therein.

11. Apparatus for cleaning sewage water, comprising a sealed tank having therein a first chamber for holding liquid, and a second chamber surrounding said first chamber adjacent the lower end thereof, and sealed off from said first chamber by a wall having good heat transfer properties, means including a normally-closed valve for connecting said first chamber to a supply of sewage water, means operable periodically to open said valve partially to fill said first chamber with sewage water, a duct connected at one end to said first chamber adjacent the upper end thereof, and at its opposite end to said second chamber, thereby to connect said second chamber with the space in said first chamber above the level of the liquid therein, a vacuum pump connected to one of said chambers to lower the pressure in both of said chambers to a value approximately equal to the saturated vapor pressure in said space in said first chamber, a vapor fan interposed in said duct and operable to pump vapor from said space to said second chamber, the pressure and temperature of the vapor entering said second chamber being slightly greater than the pressure and temperature of the water and vapor in said first chamber, whereby upon contacting the surface of said wall in said second chamber, said vapor in said second chamber is condensed and transfers heat through said wall to the liquid in said first chamber, means for pumping the condensed liquid out of said second chamber, said means for periodically opening said valve comprising means in said first chamber for sensing the level of the sewage water therein, control means connected to said sensing means and operable to open said valve, when the level of the liquid in said first chamber has fallen to a predetermined low level, and to close said valve, when the level of the liquid in said first chamber has risen to a predetermined high level, said means for connecting said first chamber to a supply of sewage water further including a second tank connected adjacent its upper end to a sewage water supply line, and adjacent its lower end to said sealed tank through said valve, second liquid level sensing means in said second tank to sense the level of the liquid therein, means connecting said second liquid level sensing means to said control means and operative to enable said valve to be opened by said control means only when the level of the liquid in said second tank has reached a predetermined high level therein, a wiper mounted to rotate in said first chamber adjacent the bottom thereof, and having its outer edge disposed in closely spaced relation to the inner surface of said first chamber to sweep deposits from said inner surface, when said wiper is rotated, and drive means for rotating said wiper, said control means including means for operating said drive means, said vacuum pump and said vapor fan only when said level of said liquid in said first chamber is between said high and low levels.

12. Apparatus as defined in claim 11, including a second duct connected to the interior of said first chamber at the bottom thereof and extending exteriorly of said sealed tank, a second, normally-closed valve interposed in said second duct normally to seal the latter, and means operative after the first-named valve has been opened a predetermined number of times momentarily to open said second valve to empty the contents of said first chamber.

References Cited

UNITED STATES PATENTS

| | | | |
|---|---|---|---|
| 1,433,040 | 10/1922 | Sandberg | 159—24 R |
| 3,251,398 | 5/1966 | Greenfield | 159—44 X |
| 3,304,991 | 2/1967 | Greenfield | 159—44 X |
| 3,337,420 | 8/1967 | Zeff et al. | 202—181 |
| 3,493,468 | 2/1970 | Arcari | 202—160 |
| 3,503,433 | 3/1970 | Riva et al. | 159—44 |
| 2,492,333 | 12/1949 | Swindin | 23—273 |
| 2,859,809 | 11/1958 | Ehrisman | 159—44 |
| 3,190,817 | 6/1965 | Neugebauer et al | 202—236 |
| 3,486,865 | 12/1969 | Furusawa et al. | 23—285 |

FOREIGN PATENTS

| | | | |
|---|---|---|---|
| 1,022 | 1902 | Great Britain | 159—6 W |

NORMAN YUDKOFF, Primary Examiner

J. SOFER, Assistant Examiner

U.S. Cl. X.R.

202—175, 187, 176; 203—26; 159—25 A, 1 RW